United States Patent
Le et al.

(10) Patent No.: US 12,499,587 B2
(45) Date of Patent: Dec. 16, 2025

(54) FLOW-AGNOSTIC NEURAL VIDEO COMPRESSION

(71) Applicant: QUALCOMM Incorporated, San Diego, CA (US)

(72) Inventors: Hoang Cong Minh Le, La Jolla, CA (US); Reza Pourreza, San Diego, CA (US); Yang Yang, San Diego, CA (US); Yinhao Zhu, La Jolla, CA (US); Amir Said, San Diego, CA (US); Taco Sebastiaan Cohen, Amsterdam (NL)

(73) Assignee: QUALCOMM INCORPORATED, San Diego, CA (US)

(*) Notice: Subject to any disclaimer, the term of this patent is extended or adjusted under 35 U.S.C. 154(b) by 340 days.

(21) Appl. No.: 17/975,471

(22) Filed: Oct. 27, 2022

(65) Prior Publication Data
US 2023/0169694 A1 Jun. 1, 2023

Related U.S. Application Data

(60) Provisional application No. 63/284,569, filed on Nov. 30, 2021.

(51) Int. Cl.
| | |
|---|---|
| *G06T 9/00* | (2006.01) |
| *G06N 3/02* | (2006.01) |
| *G06T 3/18* | (2024.01) |
| *G06T 7/32* | (2017.01) |
| *H03M 7/30* | (2006.01) |
| *H04N 19/51* | (2014.01) |
| *H04N 19/517* | (2014.01) |

(Continued)

(52) U.S. Cl.
CPC .......... *G06T 9/002* (2013.01); *G06N 3/02* (2013.01); *G06T 3/18* (2024.01); *G06T 7/32* (2017.01);

(Continued)

(58) Field of Classification Search
CPC . G06T 9/002; G06T 2207/20084; G06T 3/18; G06T 7/32; H04N 19/51;

(Continued)

(56) References Cited

U.S. PATENT DOCUMENTS

| | | |
|---|---|---|
| 10,426,442 B1 | 10/2019 | Schnorr |
| 2020/0084427 A1 | 3/2020 | Sun et al. |

(Continued)

FOREIGN PATENT DOCUMENTS

WO  WO-2023031632 A1 * 3/2023

OTHER PUBLICATIONS

Li, Deep Contextual Video Compression, Sep. 30, 2021 [retrieved Jan. 14, 2025], Cornell University:arXiv, version: [v1], 19 pages. https://doi.org/10.48550/arXiv.2109.15047 (Year: 2021).*

(Continued)

*Primary Examiner* — Henok Shiferaw
*Assistant Examiner* — Dennis Rosario
(74) *Attorney, Agent, or Firm* — Seyfarth Shaw LLP

(57) ABSTRACT

A processor-implemented method for video compression using an artificial neural network (ANN) includes receiving a video via the ANN. The ANN extracts a first set of features of a current frame of the video and a second set of features of a reference frame of the video. The ANN determines an estimate of correlation features between the first set of features of the current frame and the second set of features of the reference frame. The estimate of the correlation features are encoded and transmitted to a receiver.

12 Claims, 11 Drawing Sheets

(51) Int. Cl.
H04N 19/85 (2014.01)
G06N 3/0455 (2023.01)

(52) U.S. Cl.
CPC .......... H03M 7/3059 (2013.01); H04N 19/51 (2014.11); H04N 19/517 (2014.11); H04N 19/85 (2014.11); G06N 3/0455 (2023.01); G06T 2207/20084 (2013.01)

(58) Field of Classification Search
CPC ...... H04N 19/537; H04N 19/50; H04N 19/85; H04N 19/517; H04N 19/52; H04N 19/521; H04N 19/513; H04N 19/54; G06N 3/02; G06N 3/0455; G06V 10/82; G06V 10/806; G06V 20/46; G06V 40/168; G06V 10/40; G06V 10/44; G06V 10/7715; G06V 10/42; G06V 10/467; G06V 10/431; G06V 10/62; G06V 10/80; H03M 7/3059; H03M 7/30
See application file for complete search history.

(56) References Cited

U.S. PATENT DOCUMENTS

| | | | | |
|---|---|---|---|---|
| 2020/0329233 | A1* | 10/2020 | Nemirofsky | H04N 19/136 |
| 2021/0150728 | A1* | 5/2021 | Ahmed | G06T 7/11 |
| 2022/0392211 | A1* | 12/2022 | Johnson | G06V 10/26 |
| 2023/0344962 | A1* | 10/2023 | Tran | H04N 7/0127 |
| 2025/0173912 | A1 | 5/2025 | Le | |

OTHER PUBLICATIONS

Priority data: GB 2112665.1 Sep. 6, 2021 (Sep. 6, 2021) of WO-2023-031632-A1 to Gunduz, et al., Encoder, Decoder and Communica 11ON System and Method for Conveying Sequences of Correlated Data Items From an Informa 11ON Source Across a Communica 11ON Channel Using Joint Source and Channel Coding, and Method of Training an Encoder Neural Network and Decoder Neural Network for Use in a Communication System, 85 pages. (Year: 2021).*

Tian et al., A Dynamic Interactive Learning Framework for Automated 3D Medical Image Segmentation, Dec. 11, 2023 [retrieved May 4, 2025], Cornell University: arXiv, version [v1], pp. 1-24. https://doi.org/10.48550/arXiv.2312.06072 (Year: 2023).*

Gonzalez Duque et al., Spatio-Temporal Consistency and Negative Label Transfer for 3D Freehand US Segmentation, Sep. 29, 2020 [retrieved May 4, 2025], Medical Image Computing and Computer Assisted Intervention—MICCAI 2020 , pp. 710-720. https://doi.org/10.1007/978-3-030-59710-8_69 (Year: 2020).*

Le H., et al., "MobileCodec: Neural Inter-Frame Video Compression on Mobile Devices", arxiv.org, Cornell University Library, 201 OLIN Library Cornell University Ithaca, NY 14853, Jul. 18, 2022, 8 Pages.

Lu G., et al., "An End-to-End Learning Framework for Video Compression", IEEE Transactions on Pattern Analysis and Machine Intelligence, IEEE Computer Society, USA, vol. 43, No. 10, Oct. Apr. 2021, pp. 3292-3308.

Partial International Search Report—PCT/US2022/048284—ISA/EPO—Feb. 8, 2023.

International Search Report and Written Opinion—PCT/US2022/048284—ISA/EPO—May 3, 2023.

Katayama T., et al., "Reference Frame Generation Algorithm using Dynamical Learning PredNet for VVC", 2021 EEE International Conference on Consumer Electronics (ICCE), IEEE, Jan. 10, 2021, pp. 1-5.

Laude T, et al., "HEVC Inter Coding Using Deep Recurrent Neural Networks and Artificial Reference Pictures", 2019 Picture Coding Symposium (PCS), IEEE, Nov. 12, 2019 (Nov. 12, 2019), XP033688127, pp. 1-5.

* cited by examiner

FLOW-AGNOSTIC NEURAL VIDEO COMPRESSION

CROSS-REFERENCE TO RELATED APPLICATION

The present application claims the benefit of U.S. Provisional Patent Application No. 63/284,569, filed on Nov. 30, 2021, and titled "FLOW-AGNOSTIC NEURAL VIDEO COMPRESSION," the disclosure of which is expressly incorporated by reference in its entirety.

FIELD OF DISCLOSURE

Aspects of the present disclosure generally relate to neural networks, and more particularly, to video compression using artificial neural networks.

BACKGROUND

Artificial neural networks may comprise interconnected groups of artificial neurons (e.g., neuron models). The artificial neural network may be a computational device or be represented as a method to be performed by a computational device. Convolutional neural networks are a type of feed-forward artificial neural network. Convolutional neural networks may include collections of neurons that each have a receptive field and that collectively tile an input space. Convolutional neural networks (CNNs), such as deep convolutional neural networks (DCNs), have numerous applications. In particular, these neural network architectures are used in various technologies, such as image recognition, pattern recognition, speech recognition, autonomous driving, and other classification tasks.

Neural networks have successful application in multimedia compression, such as video compression and image compression. Image compression is beneficial for communicating multimedia, such as images and videos. However, users may have different computer architectures with different compute capabilities and may be operating such devices under different network conditions. Conventional neural video compression methods utilize flow-based warping for motion compensation. However, flow-based warping may not be as efficient for mobile devices, which may have limited resources.

SUMMARY

The present disclosure is set forth in the independent claims, respectively. Some aspects of the disclosure are described in the dependent claims.

In an aspect of the present disclosure, a processor-implemented method for video compression using an artificial neural network (ANN) is provided. The method includes receiving a video by the ANN. The method also includes extracting, by the ANN, a first set of features of a current frame of the video and a second set of features of a reference frame of the video. Additionally, the method includes determining, by the ANN, an estimate of correlation features between the first set of features of the current frame and the second set of features of the reference frame. Further, the method includes transmitting the estimate of correlation features to a receiver.

In an aspect of the present disclosure, an apparatus for video compression using an artificial neural network (ANN) is provided. The apparatus includes a memory and one or more processors coupled to the memory. The processor(s) are configured to receive a video by the ANN. The processor(s) are also configured to extract, by the ANN, a first set of features of a current frame of the video and a second set of features of a reference frame of the video. In addition, the processor(s) are configured to determine, by the ANN, an estimate of correlation features between the first set of features of the current frame and the second set of features of the reference frame. Further, the processor(s) are configured to transmit the estimate of correlation features to a receiver.

In an aspect of the present disclosure, a processor-implemented method for video compression using an artificial neural network (ANN) is provided. The method includes receiving, by the ANN, a reference frame of a video and an estimate of correlation features between a current frame of the video and the reference frame of the video. The method also includes extracting, by the ANN a first set of features of the reference frame of the video. Additionally, the method includes decoding, by the ANN, the estimate of correlation features. Further, the method includes generating, by the ANN, a prediction of the current frame of the video based on the decoded estimate of correlation features and the first set of features of the reference frame of the video.

In an aspect of the present disclosure, an apparatus for video compression using an artificial neural network (ANN) is provided. The apparatus includes a memory and one or more processors coupled to the memory. The processor(s) are configured to receive, by the ANN, a reference frame of a video and an estimate of correlation features between a current frame of the video and the reference frame of the video. The processor(s) are also configured to extract, by the ANN a first set of features of the reference frame of the video. In addition, the processor(s) are configured to decode, by the ANN, the estimate of correlation features. Further, the processor(s) are configured to generating, by the ANN, a prediction of the current frame of the video based on the decoded estimate of correlation features and the first set of features of the reference frame of the video.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
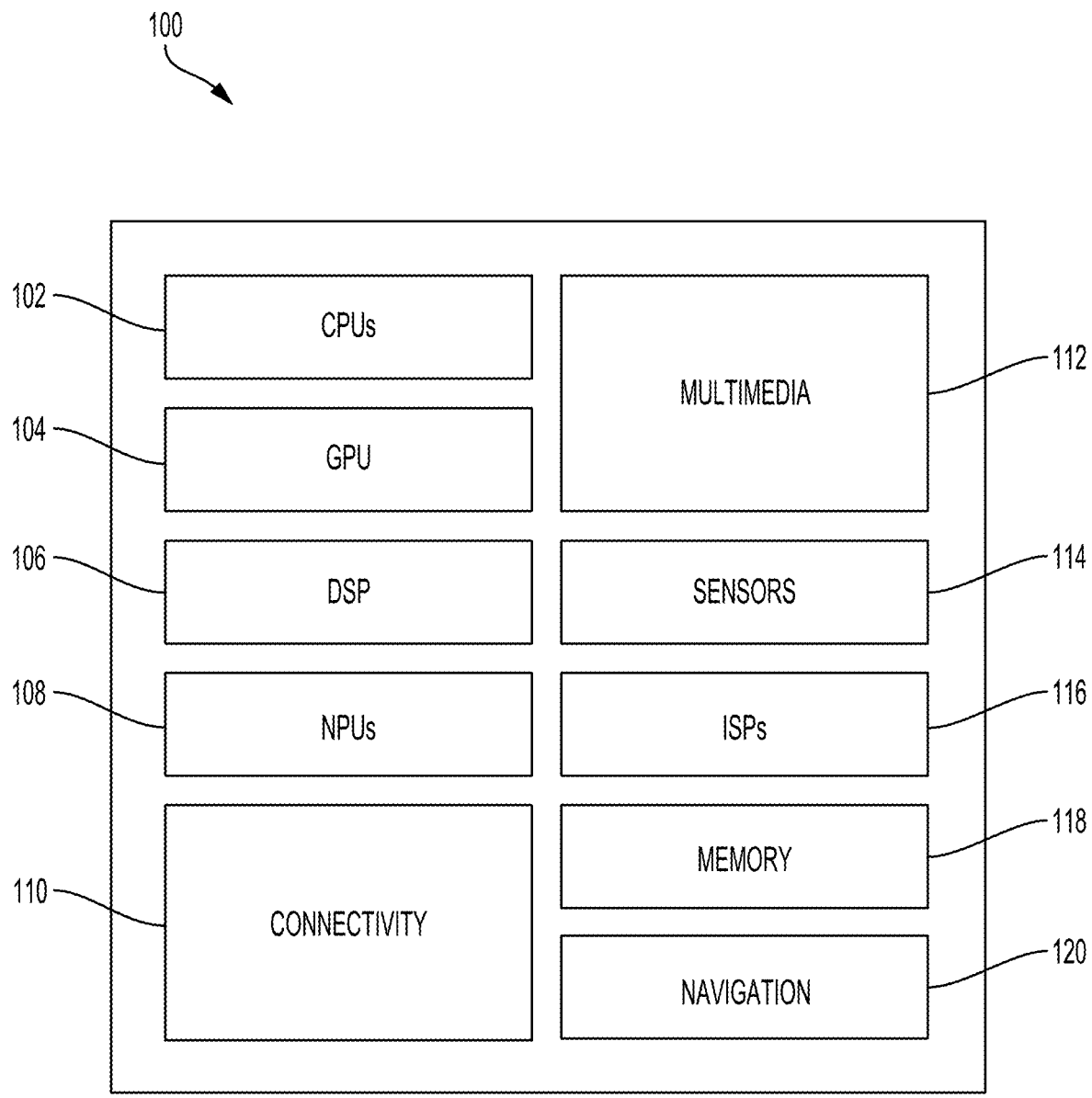
FIG. 1 illustrates an example implementation of a neural network using a system-on-a-chip (SOC), including a general-purpose processor, in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

As described, neural networks have successful application in multimedia compression such as video compression. Conventional neural video compression methods utilize flow-based warping for motion compensation. However, flow-based warping may not be hardware-friendly or efficient for mobile devices, which may have limited resources.

To address these and other challenges, aspects of the present disclosure are directed to flow-agnostic neural video compression. Rather than using flow-based warping, warping operators may be replaced with a fully convolutional neural network. In some aspects, the fully convolutional neural network may be configured with one or more auto-encoders. An auto-encoder may learn a coding of unlabeled data and includes an encoder that maps an input into the code and a decoder that maps the code to a reconstruction of the input.

FIG. 1 illustrates an example implementation of a system-on-a-chip (SOC) 100, which may include a central processing unit (CPU) 102 or a multi-core CPU configured for operating an artificial neural network (e.g., a neural end-to-end network) to provide flow-agnostic video compression. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU 108 is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In aspects of the present disclosure, the instructions loaded into the general-purpose processor 102 may include code to receive a video by an artificial neural network (ANN). The general-purpose processor 102 may also include code to extract, via the ANN, a first set of features of a current frame of the video and a second set of features of a reference frame of the video. The general-purpose processor 102 may additionally include code to determine, by the ANN, an estimate of correlation features between the first set of features of the current frame and the second set of features of the reference frame. The general-purpose processor 102 may further include code to transmit the estimate of the correlation features to a receiver.

In other aspects of the present disclosure, the instructions loaded into the general-purpose processor 102 may include code to receive, by an artificial neural network (ANN), a reference frame of a video and an estimate of correlation features between a current frame of the video and the reference frame of the video. The general-purpose processor 102 may also include code to extract, by the ANN, a first set of features of the reference frame of the video. The general-purpose processor 102 may additionally include code to decode, by the ANN, the estimate of the correlation features.

The general-purpose processor 102 may further include code to generate, by the ANN, a prediction of the current frame of the video based on the decoded estimate of the correlation features and the first set of features of the reference frame of the video.

In further aspects of the present disclosure, the instructions loaded into the general-purpose processor 102 may include code to receive, by the ANN, a history of multiple frames of a video. The general-purpose processor 102 may also include code to generate, by the ANN, a reference frame from the history of multiple frames. The general-purpose processor 102 may additionally include code to generate, by the ANN, a prediction of a current frame of the video based on the reference frame and the current frame. The general-purpose processor 102 may further include code to generate a reconstruction of the current frame based on the prediction of the current frame of the video and a residual computed based on a difference between the current frame of the video and the prediction of the current frame of the video.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
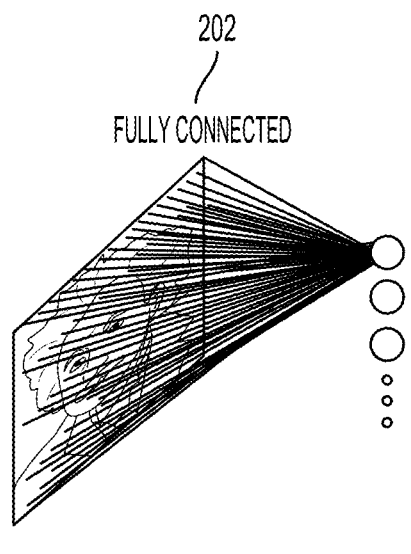
FIGS. 2A, 2B, and 2C are diagrams illustrating a neural network, in accordance with aspects of the present disclosure.
Figure 2B:
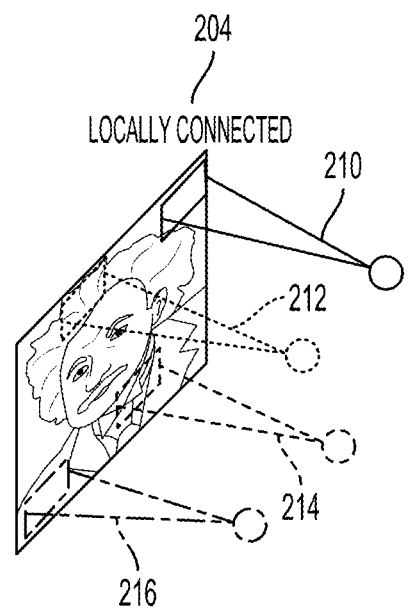

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer because the higher layer neurons in a given region may receive inputs that are tuned through training to the properties of a restricted portion of the total input to the network.

Figure 2C:
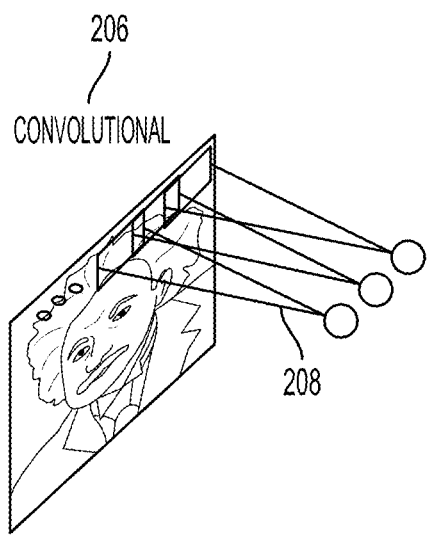

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
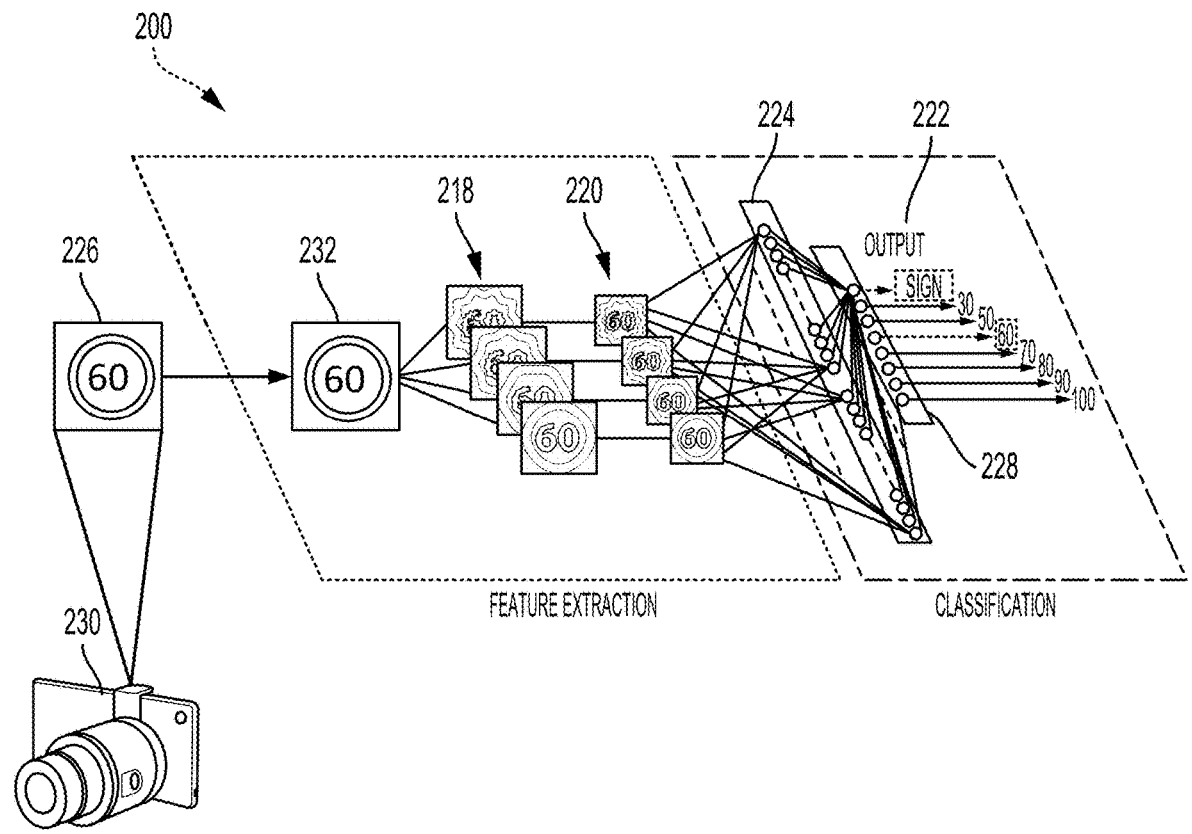
FIG. 2D is a diagram illustrating an exemplary deep convolutional network (DCN), in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 may be a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 may likely be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN 200 may be presented with new images and a forward pass through the DCN 200 may yield an output 222 that may be considered an inference or a prediction of the DCN 200.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). A RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
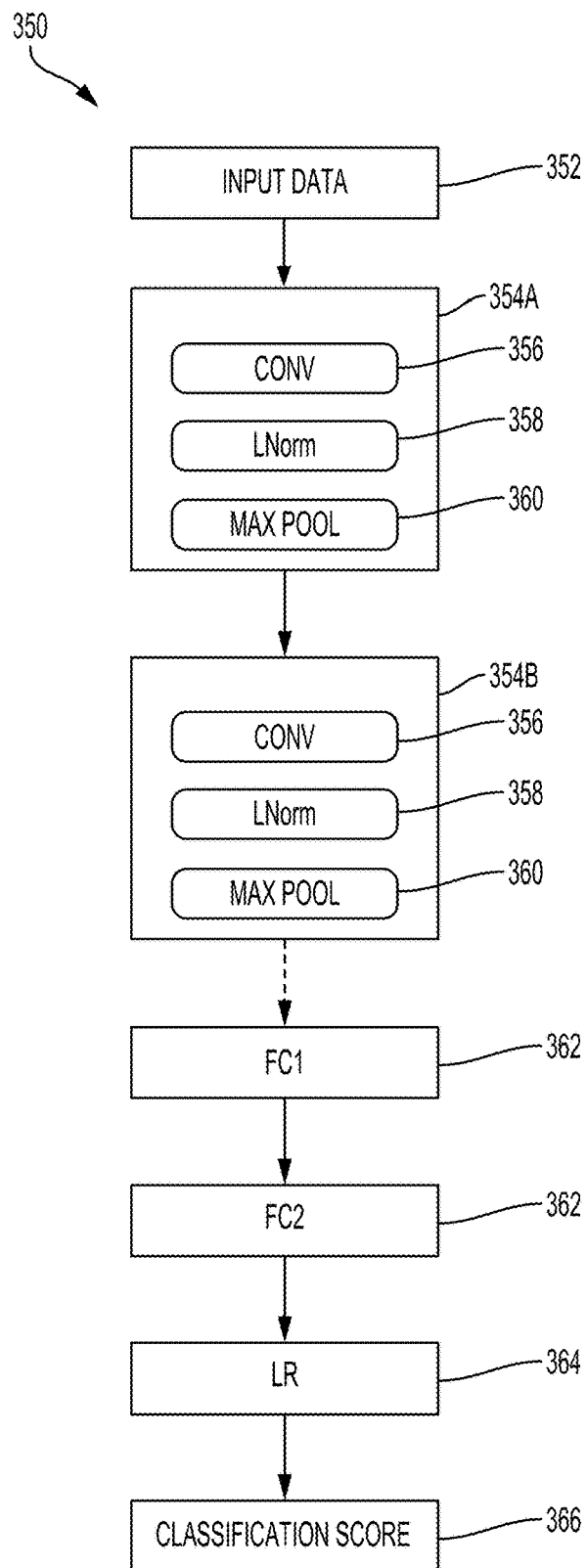
FIG. 3 is a block diagram illustrating an exemplary deep convolutional network (DCN), in accordance with aspects of the present disclosure.

FIG. 3 is a block diagram illustrating a DCN 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360. Although only two of the convolution blocks 354A, 354B are shown, the present disclosure is not so limiting, and instead, any number of the convolution blocks 354A, 354B may be included in the deep convolutional network 350 according to design preference.

The convolution layers 356 may include one or more convolutional filters, which may be applied to the input data to generate a feature map. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 (e.g., FIG. 1) to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Figure 4:
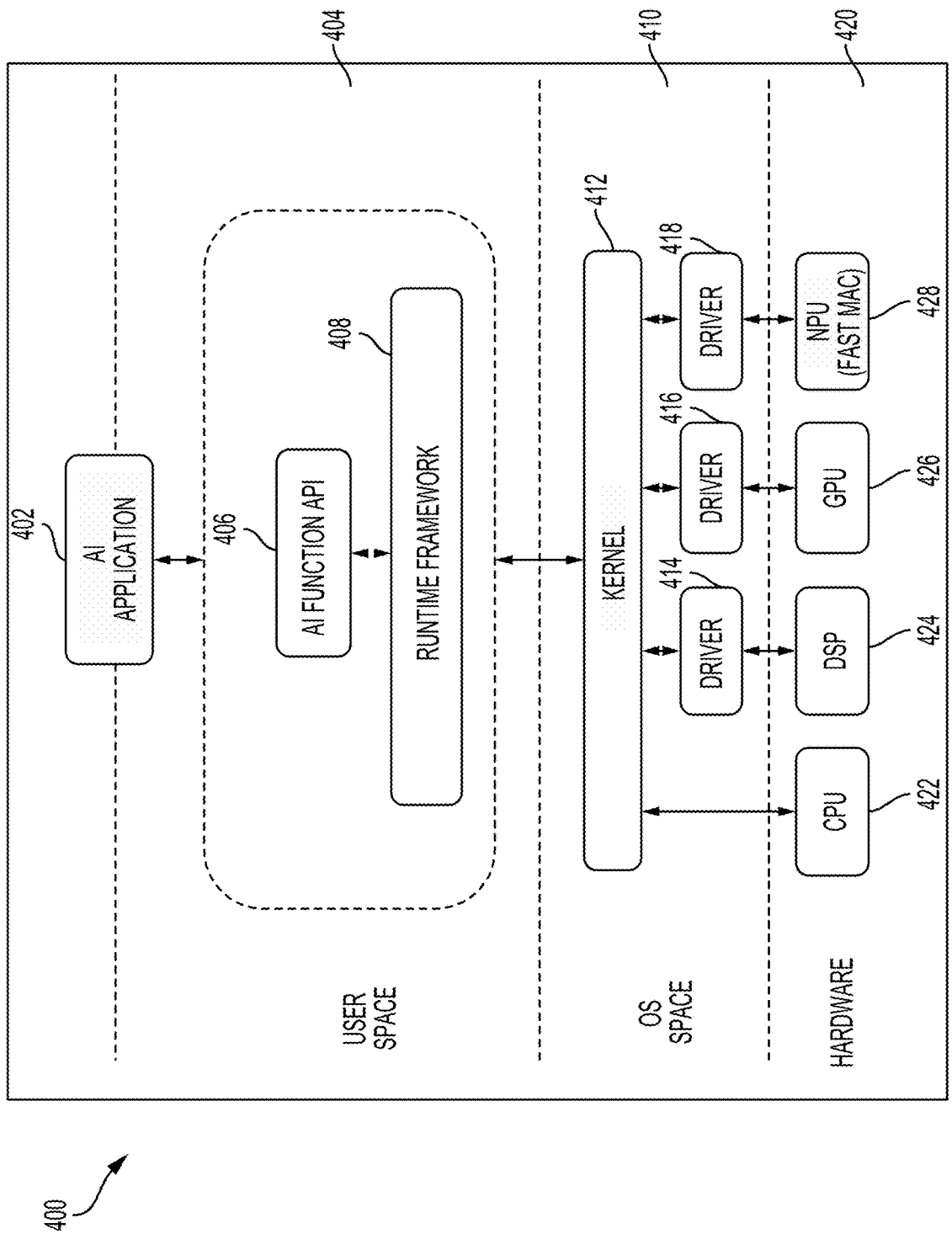
FIG. 4 is a block diagram illustrating an exemplary software architecture that may modularize artificial intelligence (AI) functions, in accordance with aspects of the present disclosure.

FIG. 4 is a block diagram illustrating an exemplary software architecture 400 that may modularize artificial intelligence (AI) functions. Using the architecture 400, applications may be designed that may cause various processing blocks of an SOC 420 (for example a CPU 422, a DSP 424, a GPU 426 and/or an NPU 428) (which may be similar to SoC 100 of FIG. 1) to support adaptive rounding as disclosed for post-training quantization for an AI application 402, according to aspects of the present disclosure.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in an AI function application programming interface (API), such as a SceneDetect API 406 to provide an estimate of the current scene. This request may ultimately rely on the output of a deep neural network configured to provide an inference response based on video and positioning data, for example. The deep neural network may be a differential neural network configured to provide scene estimates based on video and positioning data, for example.

A run-time engine 408, which may be compiled code of a runtime framework, may be further accessible to the AI application 402. The AI application 402 may cause the run-time engine 408, for example, to request an inference, such as a scene estimate, at a particular time interval or triggered by an event detected by the user interface of the application 402. When caused to provide an inference response (e.g., to estimate the scene), the run-time engine 408 may in turn send a signal to an operating system in an operating system (OS) space 410, such as a Kernel 412, running on the SOC 420. The operating system, in turn, may cause a continuous relaxation of quantization to be performed on the CPU 422, the DSP 424, the GPU 426, the NPU 428, or some combination thereof. The CPU 422 may be accessed directly by the operating system, and other processing blocks may be accessed through a driver, such as a driver 414, 416, or 418 for, respectively, the DSP 424, the GPU 426, or the NPU 428. In the exemplary example, the deep neural network may be configured to run on a combination of processing blocks, such as the CPU 422, the DSP 424, and the GPU 426, or may be run on the NPU 428.

As described, aspects of the present disclosure are directed to flow-agnostic video compression. In accordance with aspects of the present disclosure, rather than using a flow-warping operator, motion compensation is provided via fully convolutional operators. For example, instead of warping the previous frame using optical flows, a convolutional neural network may extract feature representations of video frames. Correlation features between a current frame and a previous frame may be determined. The correlation features may be encoded and transmitted to a receiver. The encoded correlation features may be decoded and used along with features of the previous frame to determine a prediction $\tilde{x}_i$ of the current frame.

Figure 5:
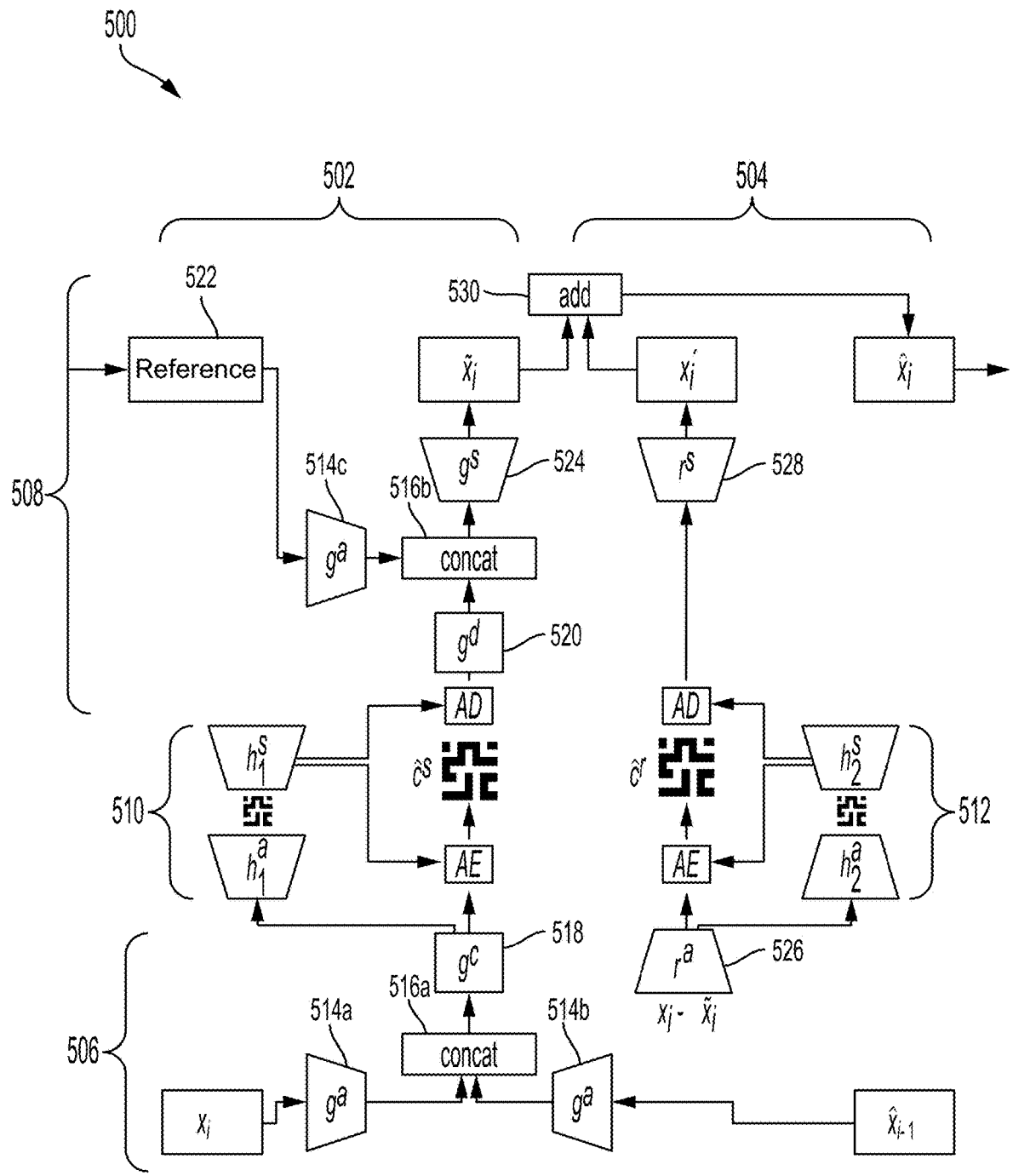
FIGS. 5-7 are block diagrams illustrating example architectures for flow-agnostic video compression, in accordance with aspects of the present disclosure.

FIG. 5 is a block diagram illustrating an example architecture 500 for flow-agnostic video compression, in accordance with aspects of the present disclosure. The architecture 500 may include a motion network 502 and a residual network 504. The motion network 502 and the residual network 504 may, for example, be implemented as auto-encoders.

The motion network 502 may provide motion compensation as a feature transformation. In the example of FIG. 5, the motion network 502 may include an encoder 506, a decoder 508, and a prior network 510. The encoder 506 may include a feature extractor $g^a$ 514a. The feature extractor $g^a$ 514a may be a convolutional neural network (e.g., 350 shown in FIG. 3), for instance. The feature extractor $g^a$ 514a may receive a video as an input. The video may include multiple frames. As shown, the feature extractor $g^a$ 514a may receive a current frame $x_i$ of the video to be compressed. The feature extractor $g^a$ 514a may process the current frame $x_i$ through one or more convolutional layers to extract a set of features and generate a feature representation of the current frame $x_i$. In addition, a feature extractor $g^a$ 514b may receive a previous frame of the video $\hat{x}_{i-1}$. Although multiple feature extractors $g^a$ are shown in FIG. 5, this is merely an example and for ease of illustration. Rather, one or more feature extractors $g^a$ may be employed. The feature extractor $g^a$ 514b may process the previous frame of the video $\hat{x}_{i-1}$ through the one or more convolutional layers to extract a set of features and generate a feature representation of the previous frame $\hat{x}_{i-1}$. The feature representations of the current and previous frames may be respectively output via feature extractors $g^a$ 514a, 514b. Feature representations of the current and previous frames may be concatenated via a concatenation layer 516a and supplied to a feature correlation estimator $g^c$ 518.

The feature correlation estimator $g^c$ 518 may also be a convolutional neural network. The feature correlation estimator $g^c$ 518 may learn and encode a set of correlation features $\hat{c}^s$ between the current frame $x_i$ and previous frame $\hat{x}_{i-1}$. The correlation features $\hat{c}^s$ may correspond to motion between the current frame $x_i$ and previous frame $\hat{x}_{i-1}$.

The correlation features $\hat{c}^s$ may be entropy coded via an arithmetic encoder (AE) and transmitted to a receiver. The entropy coding and decoding may be conducted based on a distribution of latent correlation features learned via the prior network 510.

The decoder 508 may receive the entropy coded latent representation of the correlation features $\hat{c}^s$. The entropy coded latent representation of the correlation feature $\hat{c}^s$ may be decoded via an arithmetic decoder (AD) and supplied to a code-to-feature transformer $g^d$ 520. The code-to-feature transformer $g^d$ 520 may recover the latent feature representation of the correlation features $\hat{c}^s$.

The decoder 508 may also receive a reference frame 522. The reference frame 522 may be a previous frame (e.g., for example. The reference frame 522 is supplied to a feature extractor $g^a$ 514c, which extracts a set of features to generate a feature representation of the reference frame 522.

The latent feature representation of the correlation features $\hat{c}^s$ output by the code-to-feature transformer $g^d$ 520 may be concatenated via a concatenation layer 516b with feature representation of the reference frame 522 (e.g., $\hat{x}_{i-1}$) and supplied to a frame decoder $g^s$ 524. The frame decoder $g^s$ 524 may process the concatenated feature representations of the correlation features and the reference frame 522 (e.g., $\hat{x}_{i-1}$) and generate a prediction $\tilde{x}_i$ of the current frame generated via the motion network 502.

The residual network 504 may similarly include a residual encoder $r^a$ 526, a residual decoder $r^s$ 528, and a residual prior network 512. The residual encoder $r^a$ 526 may receive a residual as an input. The residual may be given by the difference between the actual current frame $x_i$ and the current frame prediction $\tilde{x}_i$. The residual encoder $r^a$ 526 may extract a feature representation of the residual.

The feature representation of the residual may be entropy coded and transmitted to a receiver (e.g., residual decoder $r^s$ 528). The entropy coding and decoding may be conducted based on a distribution of latent residual features learned via the prior network 512.

The residual decoder $r^s$ 528 may decode the feature representation of the residual and generate a prediction $x_i'$ of the residual (e.g., $x_i - \tilde{x}_i$). This residual prediction $x_i'$ may be added via addition block 530 to the current frame prediction $\tilde{x}_i$ to generate a reconstruction $\hat{x}_i$ of the current frame $x_i$. The reconstruction $\hat{x}_i$ of the current frame $x_i$ may be transmitted to a receiver (e.g., encoder 506 of the motion network 502) for use in motion compensation for a subsequent frame of the video (e.g., $x_{i+1}$).

In some aspects, the architecture 500 may use fully convolutional operators. In doing so, motion compensation may be determined without conventional motion compensation approaches using optical flows.

Figure 6:
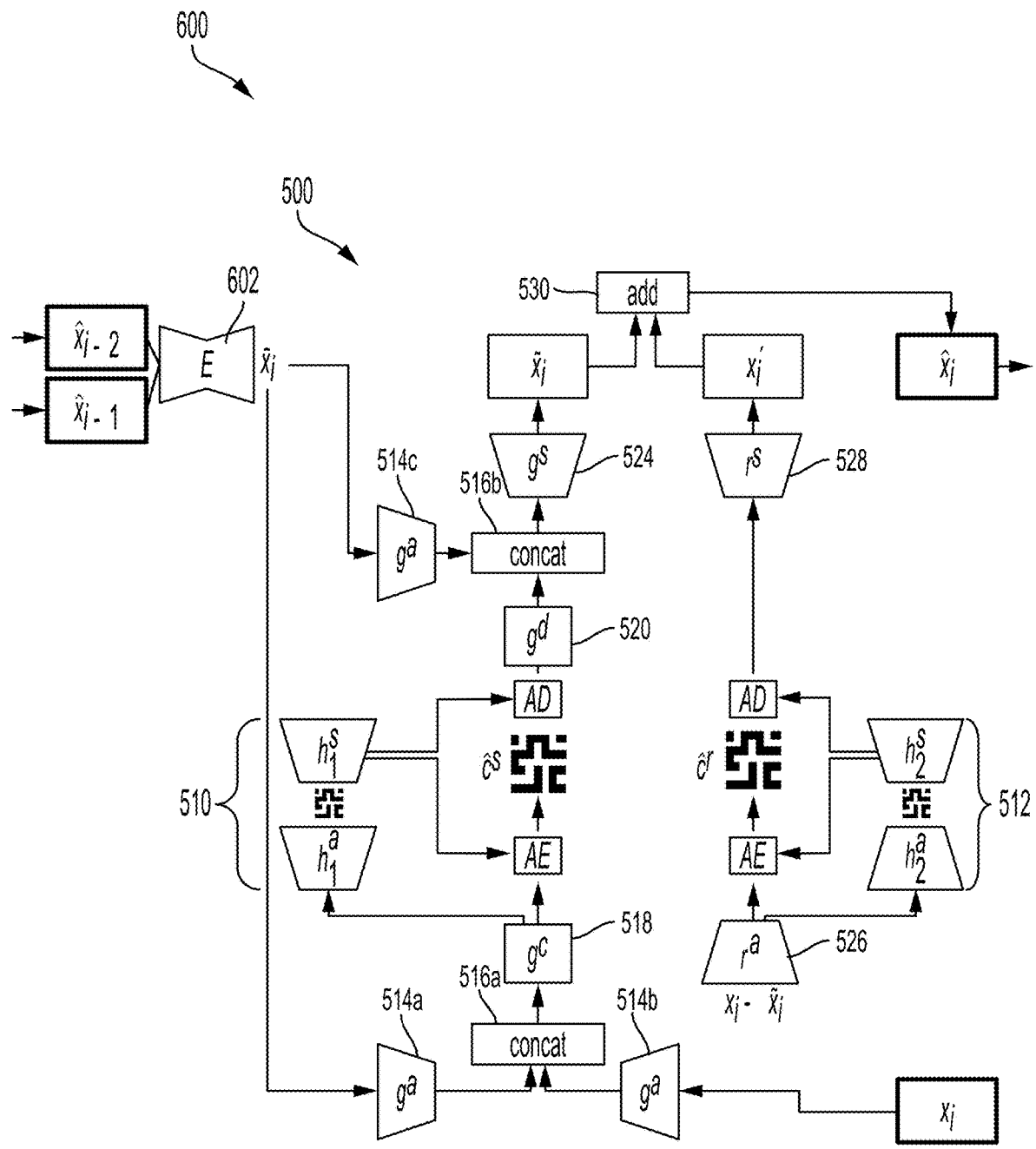

FIG. 6 is a block diagram illustrating an example architecture 600 for flow-agnostic video compression, in accordance with aspects of the present disclosure. Referring to FIG. 6, the input for the architecture 500 of FIG. 5 may be modified to further exploit the motion information from a history of multiple previously decoded frames. In FIG. 6, two previously decoded frames (e.g., $\hat{x}_{i-1}$ and $\hat{x}_{i-2}$) are shown, however the present disclosure is not so limited. Rather, two or more previously decoded frames may be included in the history of previously decoded frames. The architecture 600 may further include an extrapolator network (E) 602. The extrapolator network 602 may be a fully convolutional network, for example. The extrapolator network 602 may receive as inputs, multiple previously decoded frames (e.g., $\hat{x}_{i-1}$ and $\hat{x}_{i-2}$). The extrapolator network 602 may process the previously decoded frames (e.g., $\hat{x}_{i-1}$ and $\hat{x}_{i-2}$) and generate a reference frame prediction $\bar{x}_i$. The reference frame prediction $\bar{x}_i$ may be treated as an intermediate frame and input into the motion network 502 of architecture 500. By using multiple previously decoded frames rather than a single previously decoded frame (as shown for example in FIG. 5) as a reference, the accuracy of predicting the current frame may be increased.

Figure 7:
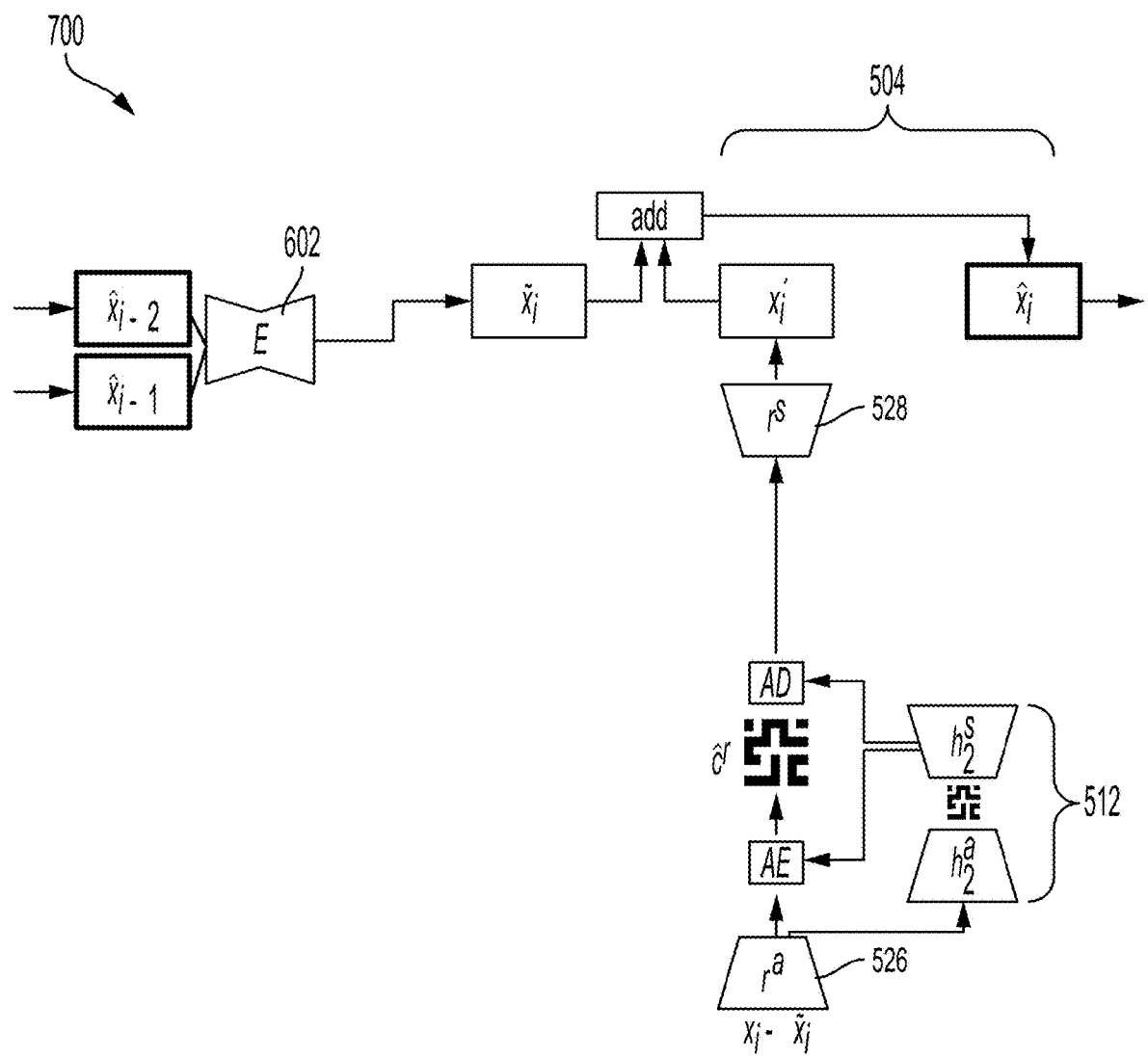

FIG. 7 is a block diagram illustrating an example architecture 700 for flow-agnostic video compression, in accordance with aspects of the present disclosure. FIG. 7 is a simplified version of FIG. 5, designed for efficiency optimization. Referring to FIG. 7, the architecture 700 may be simplified by removing the motion network 502. As such, the architecture 700 includes the extrapolator network 602 and the residual network 504. The extrapolator network 602 may directly determine a prediction $\tilde{x}_i$ of the current frame $x_i$ from a history of previous frames (e.g., ≥2 frames). The residual network 504 encodes the difference between the prediction $\tilde{x}_i$ and the current frame $x_i$, which may be added to the current frame prediction $\tilde{x}_i$ to generate the reconstruction $\hat{x}_i$ of the current frame $x_i$.

Figure 8:
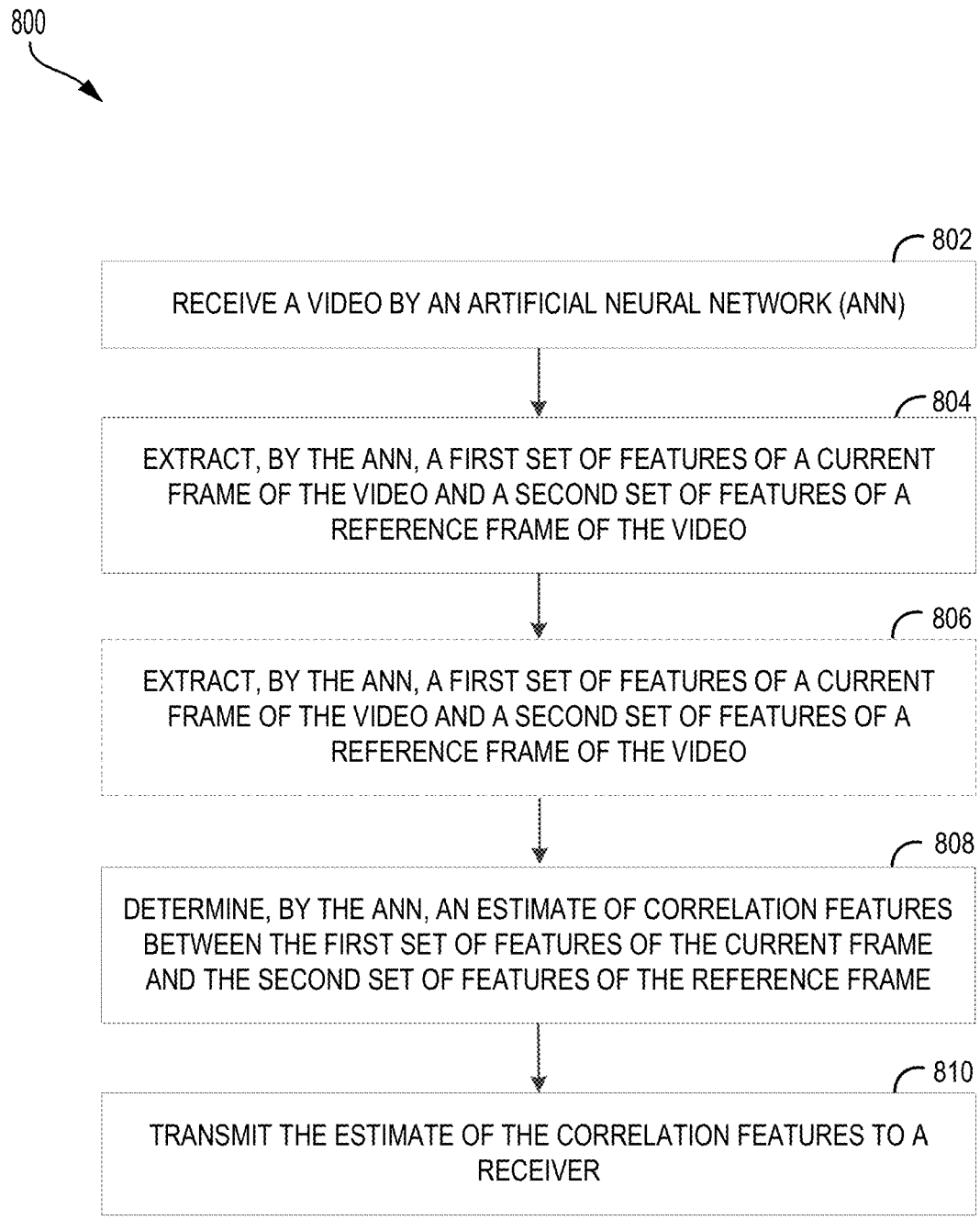
FIGS. 8-10 are flow diagrams illustrating example processes for video compression using an artificial neural network, in accordance with aspects of the present disclosure.

FIG. 8 is a flow diagram illustrating an example process 800 for video compression using an artificial neural network (ANN), in accordance with aspects of the present disclosure. As shown in FIG. 8, at block 802, the process 800 receives a video via the ANN. As described with reference to FIG. 5, the feature extractor $g^a$ 514a may receive a video as an input. The video may include multiple frames.

At block 804, the process 800 extracts, by the ANN, a first set of features of a current frame of the video and a second set of features of a reference frame of the video. As described with reference to FIG. 5, the feature extractor $g^a$ 514a may process the current frame $x_i$ through one or more convolutional layers to extract a set of features and generate a feature representation of the current frame $x_i$. Optionally, at block 806[A1], a feature extractor $g^a$ 514b may receive a previous frame of the video $\hat{x}_{i-1}$. The feature extractor $g^a$ 514b may process the previous frame of the video $\hat{x}_{i-1}$ through the one or more convolutional layers to extract a set of features and generate a feature representation of the previous frame $\hat{x}_{i-1}$.

At block 808, the process 800 determines, by the ANN, an estimate of correlation features between the first set of features of the current frame and the second set of features of the reference frame. As described with reference to FIG. 5, the feature representations of the current and previous frames may be respectively output via feature extractors $g^a$ 514a, 514b. Feature representations of the current and previous frames may be concatenated via concatenation layer 516a and supplied to a feature correlation estimator $g^c$ 518. The feature correlation estimator $g^c$ 518 may also be a convolutional neural network. The feature correlation estimator $g^c$ 518 may learn and encode a set of correlation features $\hat{c}^s$ between the current frame $x_i$ and previous frames $\hat{x}_{i-1}$. The correlation features $\hat{c}^s$ may correspond to motion between the current frame $x_i$ and the previous frame $\hat{x}_{i-1}$.

At block 810, the process 800 transmits the estimate of the correlation features to a receiver. As described with reference to FIG. 5, the correlation features $\hat{c}^s$ may be entropy coded via an arithmetic encoder (AE) and transmitted to a receiver (e.g., decoder 508).

Figure 9:
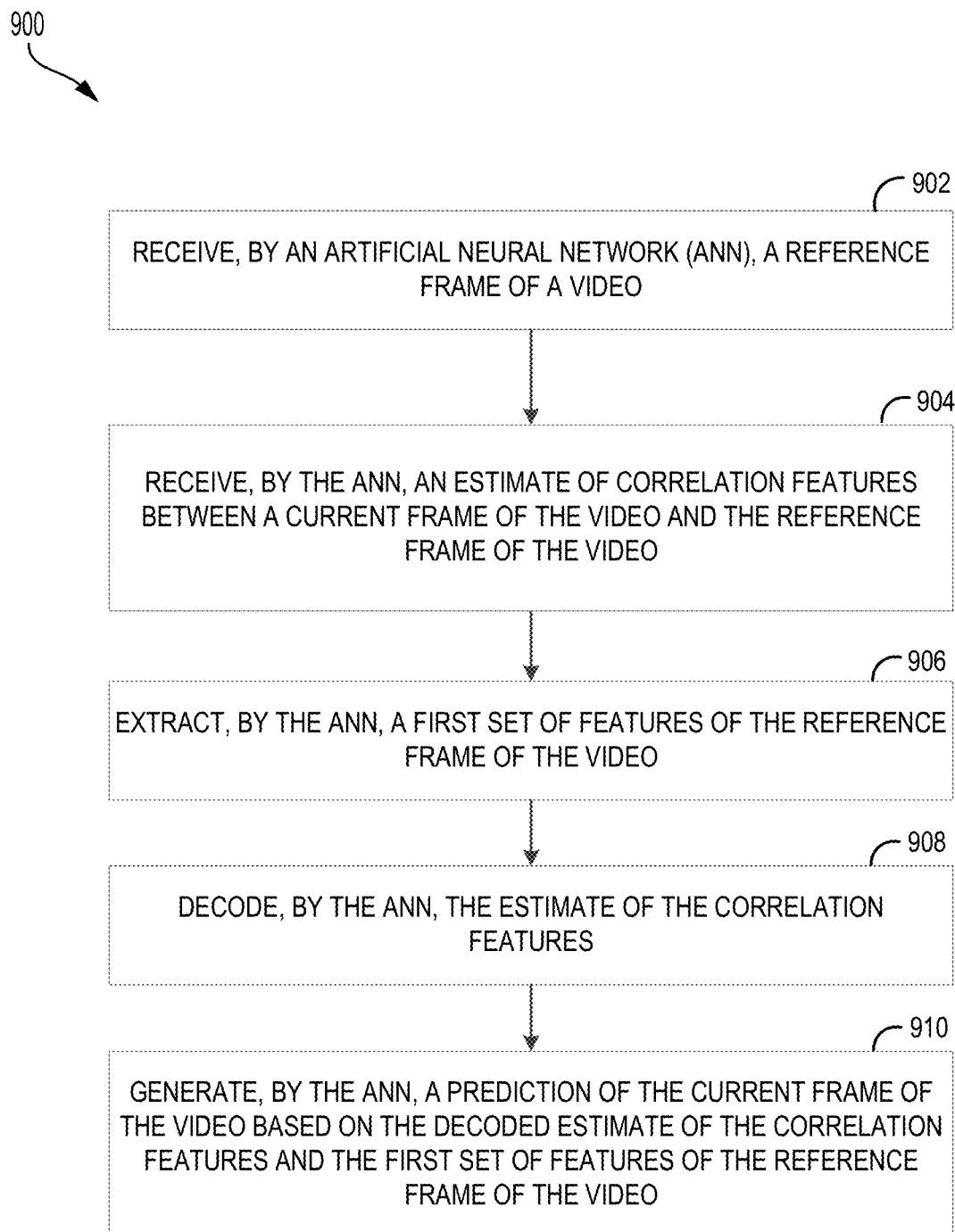

FIG. 9 is a flow diagram illustrating an example process 900 for video compression using an artificial neural network (ANN), in accordance with aspects of the present disclosure. As shown in FIG. 9, at block 902, the process 900 receives, by the ANN, a reference frame of a video. At block 904 the process 900 receives, by the ANN, an estimate of correlation features between a current frame of the video and the reference frame of the video. As shown in FIG. 5, the decoder 508 receives a reference frame 522 of a video and an estimate of correlation features $\hat{c}^s$ between a current frame $x_i$ of the video and the reference frame 522 (e.g., previous frame $\hat{x}_{i-1}$) of the video.

At block 906, the process 900 extracts, by the ANN, a first set of features of the reference frame of the video. As described, for example, with reference to FIG. 5, the decoder 508 may also receive a reference frame 522. The reference frame 522 may be a previous frame (e.g., $\hat{x}_{i-1}$), for example. The reference frame 522 is supplied to a feature extractor $g^a$ 514c, which extracts a set of features to generate a feature representation of the reference frame 522.

At block 908, the process 900 decodes, by the ANN, the estimate of the correlation features. As shown in FIG. 5, the decoder 508 may receive the entropy coded latent representation of the correlation features $\hat{c}^s$. The entropy coded latent representation of the correlation features $\hat{c}^s$ may be decoded via an arithmetic decoder (AD) and supplied to a code-to-feature transformer $g^d$ 520. The code-to-feature transformer $g^d$ 520 may recover the latent feature representation of the correlation features $\hat{c}^s$.

At block 910, the process 900 generates, by the ANN, a prediction of the current frame of the video based on the decoded estimate of the correlation features and the first set of features of the reference frame of the video. As described with reference to FIG. 5, the latent feature representation of the correlation features $\hat{c}^s$ may be concatenated via the concatenation layer 516b with the feature representation of the reference frame 522 and supplied to a frame decoder $g^s$ 524. The frame decoder $g^s$ 524 processes the concatenated feature representations of the correlation features $\hat{c}^s$ and the reference frame 522 and generates a prediction $\tilde{x}_i$ of the current frame $x_i$ generated via the motion network 502.

Figure 10:
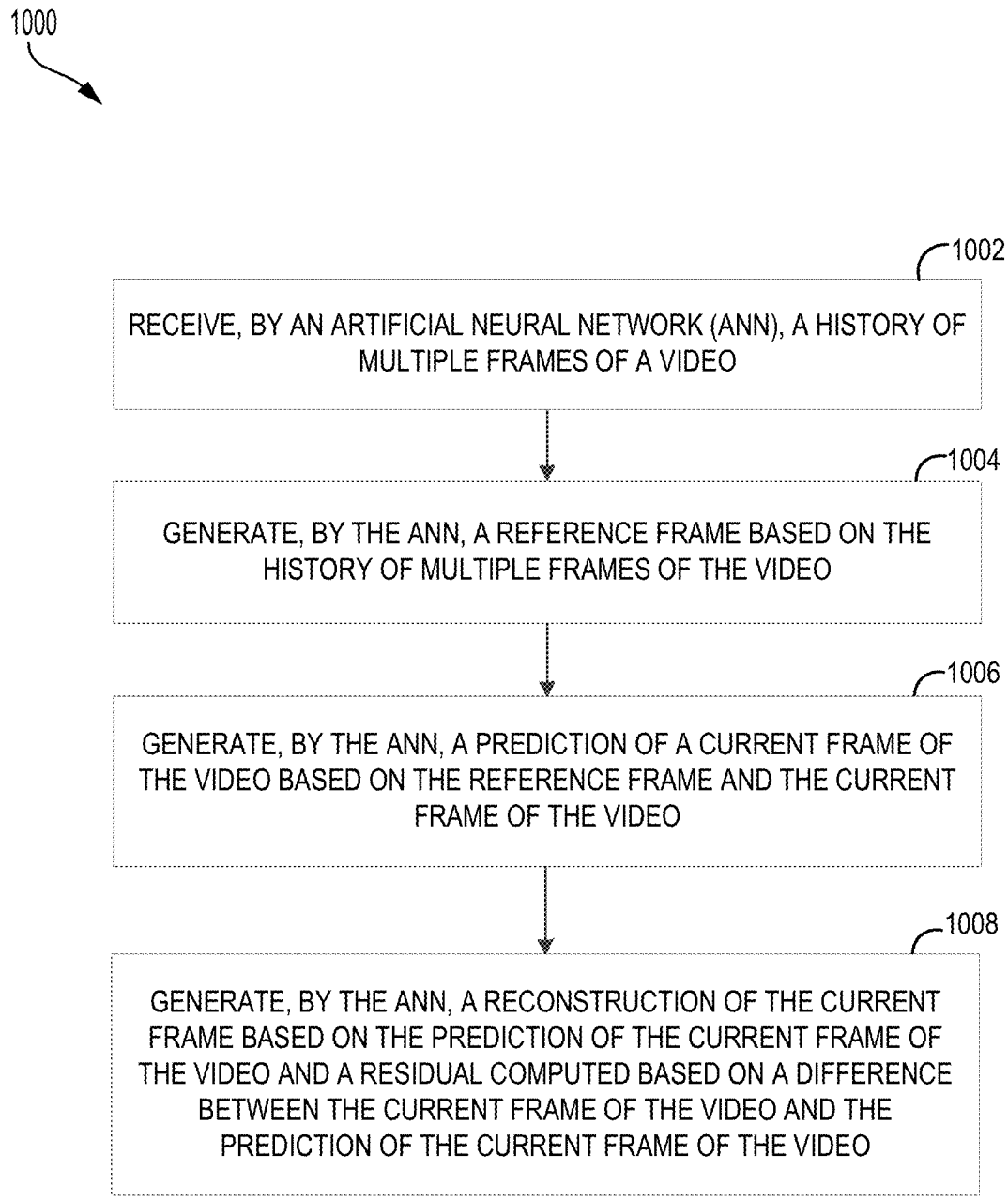

FIG. 10 is a flow diagram illustrating an example process 1000 for video compression using an artificial neural network (ANN), in accordance with aspects of the present disclosure. As shown in FIG. 10, at block 1002, the process 1000 receives, by the ANN, a history of multiple frames of a video. As described with reference to FIG. 6, the architecture 600 may further include an extrapolator network (E) 602. The extrapolator network 602 may be a fully convolutional network, for example. The extrapolator network 602 may receive as inputs, multiple previously decoded frames (e.g., $\hat{x}_{i-1}$ and $\hat{x}_{i-2}$).

At block 1004, the process 1000 generates, by the ANN, a reference frame based on the history of multiple frames of the video. As described, for example, with reference to FIG. 6, the extrapolator network 602 may process the previously decoded frames (e.g., $\hat{x}_{i-1}$ and $\hat{x}_{i-2}$) and generate a reference frame prediction $\overline{x}_i$.

At block 1006, the process 1000 generates, by the ANN, a prediction of a current frame of the video based on the reference frame and the current frame of the video. As shown in FIG. 6, a prediction $\tilde{x}_i$ of the current frame is generated using the reference frame prediction $\overline{x}_i$ produced by the extrapolator network 602 and the current frame $x_i$.

At block 1008, the process 1000 generates, by the ANN, a reconstruction of the current frame based on the prediction of the current frame of the video and a residual computed based on a difference between the current frame of the video and the prediction of the current frame of the video. As shown in FIG. 6, the residual network 504 encodes the difference between the prediction and the current frame $x_i$, which may be added to the current frame prediction $\tilde{x}_i$ to generate the reconstruction $\hat{x}_i$ of the current frame $x_i$.

Implementation examples are provided in the following numbered clauses.

1. A processor-implemented method for video compression using an artificial neural network (ANN), comprising:
    receiving a video by the ANN;
    extracting, by the ANN, a first set of features of a current frame of the video and a second set of features of a reference frame of the video;
    determining, by the ANN, an estimate of correlation features between the first set of features of the current frame and the second set of features of the reference frame; and
    transmitting the estimate of correlation features to a receiver.

2. The processor-implemented method of clause 1, further comprising determining the estimate of correlation features via fully convolutional operators of the ANN.

3. The processor-implemented method of clause 1 or 2, in which the reference frame comprises a reconstruction of a previous frame of the video.

4. The processor-implemented method of any of clauses 1-3, in which the reference frame is predicted based on reconstructions of multiple prior frames of the video.

5. A processor-implemented method for video compression using an artificial neural network (ANN), comprising:
    receiving, by the ANN, a reference frame of a video;
    receiving, by the ANN, an estimate of correlation features between a current frame of the video and the reference frame of the video;
    extracting, by the ANN a first set of features of the reference frame of the video;
    decoding, by the ANN, the estimate of correlation features; and
    generating, by the ANN, a prediction of the current frame of the video based on the decoded estimate of correlation features and the first set of features of the reference frame of the video.

6. The processor-implemented method of clause 5, further comprising:
    computing a residual based on a difference between the current frame of the video and the prediction of the current frame of the video; and
    generating a reconstruction of the current frame of the video based on the prediction of the current frame and the residual.

7. The processor-implemented method of clause 5 or 6, in which the reference frame is predicted based on reconstructions of multiple prior frames of the video.

8. A processor-implemented method for video compression using an artificial neural network (ANN), comprising:
    receiving, by the ANN, a history of multiple frames of a video;
    generating, by the ANN, a reference frame from the history of multiple frames of the video;
    generating, by the ANN, a prediction of a current frame of the video based on the reference frame and the current frame of the video; and
    generating, by the ANN, a reconstruction of the current frame based on the prediction of the current frame of the video and a residual computed based on a difference between the current frame of the video and the prediction of the current frame of the video.

9. The processor-implemented method of clause 8, in which the history comprises a plurality of previously decoded frames.

10. The processor-implemented method of clause 8 or 9, further comprising encoding the difference between the current frame of the video and the prediction of the current frame of the video, and adding the encoding to the prediction of the current frame.

11. An apparatus for video compression using an artificial neural network (ANN), comprising:
a memory; and
at least one processor coupled to the memory, the at least one processor configured:
to receive a video by the ANN;
to extract, by the ANN, a first set of features of a current frame of the video and a second set of features of a reference frame of the video;
to determine, by the ANN, an estimate of correlation features between the first set of features of the current frame and the second set of features of the reference frame; and
to transmit the estimate of correlation features to a receiver.

12. The apparatus of clause 11, in which the at least one processor is further configured:
to determine the estimate of correlation features via fully convolutional operators of the ANN.

13. The apparatus of clause 11 or 12, in which the reference frame comprises a reconstruction of a previous frame of the video.

14. The apparatus of any of clauses 11-13, in which the at least one processor is further configured to predict the reference frame based on reconstructions of multiple prior frames of the video.

15. An apparatus for video compression using an artificial neural network (ANN), comprising:
a memory; and
at least one processor coupled to the memory, the at least one processor configured:
to receive a reference frame of a video;
to receive an estimate of correlation features between a current frame of the video and the reference frame of the video;
to extract a first set of features of the reference frame of the video;
to decode the estimate of correlation features; and
to generate a prediction of the current frame of the video based on the decoded estimate of correlation features and the first set of features of the reference frame of the video.

16. The apparatus of clause 15, in which the at least one processor is further configured:
to compute a residual based on a difference between the current frame of the video and the prediction of the current frame of the video; and
to generate a reconstruction of the current frame of the video based on the prediction of the current frame and the residual.

17. The apparatus of clause 15 or 16, in which the at least one processor is further configured to predict the reference frame based on reconstructions of multiple prior frames of the video.

18. An apparatus for video compression using an artificial neural network (ANN), comprising:
a memory; and
at least one processor coupled to the memory, the at least one processor configured:
to receive, by the ANN, a history of multiple frames of a video;
to generate, by the ANN, a reference frame from the history of multiple frames of the video;
to generate, by the ANN, a prediction of a current frame of the video based on the reference frame and the current frame of the video; and
to generate, by the ANN, a reconstruction of the current frame based on the prediction of the current frame of the video and a residual computed based on a difference between the current frame of the video and the prediction of the current frame of the video.

19. The apparatus of clause 18, in which the history comprises a plurality of previously decoded frames.

20. The apparatus of clause 18 or 19, in which the at least one processor is further configured to encode the difference between the current frame of the video and the prediction of the current frame of the video, and add the encoding to the prediction of the current frame.

In one aspect, the receiving means, extracting means, determining means transmitting means decoding means, means for generating, by the ANN, a prediction, means for generating, by the ANN, a prediction, means for generating, by the ANN, a reference frame, and/or means for generating by the ANN, a reconstruction may be the CPU 102, program memory associated with the CPU 102, the dedicated memory block 118, fully connected layers 362, NPU 428/ and/or the routing connection processing unit 216 configured to perform the functions recited. In another configuration, the aforementioned means may be any module or any apparatus configured to perform the functions recited by the aforementioned means.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described without departing from the scope of the claims.

What is claimed is:

1. A processor-implemented method for flow-agnostic neural network based video compression using an artificial neural network (ANN) not using flow-based warping, the processor-implemented method comprising:
   receiving a video by the ANN;
   extracting, by the ANN, a first set of features of a current frame of the video and a second set of features of a reference frame of the video, wherein the first set of features are indicative of a first feature representation associated with the current frame and the second set of features are indicative of a second feature representation associated with the reference frame;
   determining, by the ANN, an estimate of at least one correlation feature between the first set of features of the current frame and the second set of features of the reference frame; and
   transmitting the estimate of the at least one correlation feature to a receiver.

2. The processor-implemented method of claim 1, in which the reference frame comprises a reconstruction of a previous frame of the video.

3. The processor-implemented method of claim 1, in which the reference frame is predicted based on reconstructions of multiple prior frames of the video.

4. A processor-implemented method for flow-agnostic neural network based video compression using an artificial neural network (ANN) not using flow-based warping, the processor-implemented method comprising:
   receiving, by the ANN, a reference frame of a video;
   receiving, by the ANN, an estimate of correlation features between a current frame of the video and the reference frame of the video;
   extracting, by the ANN, a first set of features of the reference frame of the video, wherein the first set of features amount to a feature representation of the reference frame;
   decoding the estimate of correlation features using fully convolutional operators of the ANN; and
   generating, by the ANN, a prediction of the current frame of the video based on the decoded estimate of correlation features and the first set of features of the reference frame of the video.

5. The processor-implemented method of claim 4, further comprising:
   computing a residual based on a difference between the current frame of the video and the prediction of the current frame of the video; and
   generating a reconstruction of the current frame of the video based on the prediction of the current frame and the residual.

6. The processor-implemented method of claim 4, in which the reference frame is predicted based on reconstructions of multiple prior frames of the video.

7. An apparatus for flow-agnostic neural network based video compression using an artificial neural network (ANN) not using flow-based warping, comprising:
   at least one memory; and
   at least one processor coupled to the at least one memory, the at least one processor configured to:
   receive a video by the ANN;
   extract, by the ANN, a first set of features of a current frame of the video and a second set of features of a reference frame of the video, wherein the first set of features are indicative of a first feature representation associated with the current frame and the second set of features are indicative of a second feature representation associated with the reference frame;
   determine, by the ANN, an estimate of at least one correlation feature between the first set of features of the current frame and the second set of features of the reference frame; and
   transmit the estimate of the at least one correlation feature to a receiver.

8. The apparatus of claim 7, in which the reference frame comprises a reconstruction of a previous frame of the video.

9. The apparatus of claim 7, in which the at least one processor is further configured to predict the reference frame based on reconstructions of multiple prior frames of the video.

10. An apparatus for flow-agnostic neural network based video compression using an artificial neural network (ANN) not using flow-based warping, comprising:
   at least one memory; and
   at least one processor coupled to the at least one memory, the at least one processor configured to:
      receive, by the ANN, a reference frame of a video;
      receive, by the ANN, an estimate of correlation features between a current frame of the video and the reference frame of the video;
      extract, by the ANN, a first set of features of the reference frame of the video, wherein the first set of features amount to a feature representation of the reference frame;
      decode the estimate of correlation features using fully convolutional operators of the ANN; and
      generate a prediction of the current frame of the video based on the decoded estimate of correlation features and the first set of features of the reference frame of the video.

11. The apparatus of claim 10, in which the at least one processor is further configured to:
   compute a residual based on a difference between the current frame of the video and the prediction of the current frame of the video; and
   generate a reconstruction of the current frame of the video based on the prediction of the current frame and the residual.

12. The apparatus of claim 10, in which the at least one processor is further configured to predict the reference frame based on reconstructions of multiple prior frames of the video.

* * * * *